US012499991B1

(12) United States Patent
Jain et al.

(10) Patent No.: US 12,499,991 B1
(45) Date of Patent: Dec. 16, 2025

(54) APPARATUS AND METHOD FOR GENERATING A MODIFIED COMPOSITE VIEW AS A FUNCTION OF A PLURALITY OF WHOLE SLIDE IMAGES AND A RECONSTRUCTION MODEL

(71) Applicant: Pramana, Inc., Cambridge, MA (US)

(72) Inventors: Jaya Jain, Shahpura (IN); Raghubansh Bahadur Gupta, Bangalore (IN); Arun Koushik Parthasarathy, Bengaluru (IN); Tushar Singh, Bangalore (IN); Sai Pranav Varada Raghunath, Bengaluru (IN); Bharathwaj Raghunathan, Oakville (CA); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/210,555

(22) Filed: May 16, 2025

(51) Int. Cl.
*G16H 30/40* (2018.01)
*G06T 5/50* (2006.01)
(Continued)

(52) U.S. Cl.
CPC ............... *G16H 30/40* (2018.01); *G06T 5/50* (2013.01); *G06T 7/33* (2017.01); *G06V 10/761* (2022.01);
(Continued)

(58) Field of Classification Search
CPC .......... G16H 30/20; G16H 30/40; G06T 5/50; G06T 7/33; G06T 2207/20084; G06T 2207/20221; G06V 10/761
See application file for complete search history.

(56) References Cited

U.S. PATENT DOCUMENTS

2013/0089249 A1* 4/2013 Mueller ............... G06V 20/695
382/128
2016/0321809 A1* 11/2016 Chukka .................. G16H 30/20
(Continued)

FOREIGN PATENT DOCUMENTS

WO 2016185556 A1 11/2016

OTHER PUBLICATIONS

Muhlich et al., "Stitching and registering highly multoplexed whole-slide images of tissues and tumors using ASHLAR", Bioinformatics, 38(19), 2022, pp. 4613-4621. (Year: 2022).*
(Continued)

*Primary Examiner* — Jennifer Mehmood
*Assistant Examiner* — Jose M Torres
(74) *Attorney, Agent, or Firm* — Caldwell Intellectual Property Law

(57) ABSTRACT

An apparatus and method for generating a modified composite view as a function of a plurality of whole slide images and a reconstruction model. The apparatus includes at least a processor and a memory communicatively connected to the at least a processor configured to receive a plurality of whole slide images, register the plurality of whole slide images based on one or more features of at least a structure by identifying, at least a structural continuation in the first image and the second image, and adjusting the first image with respect to the second image, generate an initial composite view by positioning the plurality of whole slide images into the initial composite view based on the at least a structural continuation of the one or more features of the at least a structure, and display the initial composite view.

19 Claims, 7 Drawing Sheets

(51) Int. Cl.
*G06T 7/33* (2017.01)
*G06V 10/74* (2022.01)
*G16H 30/20* (2018.01)

(52) U.S. Cl.
CPC ... *G16H 30/20* (2018.01); *G06T 2207/20084* (2013.01); *G06T 2207/20221* (2013.01)

(56) References Cited

U.S. PATENT DOCUMENTS

| | | |
|---|---|---|
| 2021/0201485 A1* | 7/2021 | Chukka ................ G06T 7/0012 |
| 2024/0013339 A1* | 1/2024 | Chukka .................... G06T 3/14 |
| 2024/0362865 A1* | 10/2024 | Seymour .................. G06T 7/73 |
| 2024/0420352 A1 | 12/2024 | Prems et al. |
| 2025/0022149 A1 | 1/2025 | Anderson et al. |
| 2025/0211850 A1* | 6/2025 | Perugupalli ............ H04N 23/61 |

OTHER PUBLICATIONS

Paknezhad et al., "Regional registration of whole slide image stacks containing major histological artifacts", BMC Bioinformatics (2020)21:558, pp. 1-20. (Year: 2020).*

* cited by examiner

APPARATUS AND METHOD FOR GENERATING A MODIFIED COMPOSITE VIEW AS A FUNCTION OF A PLURALITY OF WHOLE SLIDE IMAGES AND A RECONSTRUCTION MODEL

FIELD OF THE INVENTION

The present invention generally relates to the field of image processing. In particular, the present invention is directed to an apparatus and a method for generating a modified composite view as a function of a plurality of whole slide images and a reconstruction model.

BACKGROUND

In histopathology, large tissue samples, like tumors, are often sectioned into smaller fragments and mounted onto multiple slides for analysis. A pathologist must mentally reconstruct these individual sections to form a complete representation of the original tissue. This manual process is time-consuming, prone to errors, and lacks a standardized digital approach.

SUMMARY OF THE DISCLOSURE

In an aspect, an apparatus for generating a modified composite view as a function of a plurality of whole slide images and a reconstruction model includes at least a processor and a memory communicatively connected to the at least a processor. The memory contains instructions configuring the processor to receive, using the at least a processor, a plurality of whole slide images, register, using a reconstruction algorithm, the plurality of whole slide images based on one or more features of at least a structure, wherein registering a first image of the plurality of whole slide images and a second image of the plurality of whole slide images comprises identifying, at least a structural continuation, using the one or more features, between the first image and the second image, and adjusting, based on the at least a structural continuation, the first image with respect to the second image, generate, using at least a reconstruction model, an initial composite view, wherein the initial composite view comprises the plurality of whole slide images, wherein generating the initial composite view comprises positioning, using one or more spatial transformations, the plurality of whole slide images into the initial composite view based on the at least a structural continuation of the one or more features of the at least a structure, and display, using a graphical user interface of a downstream device, the initial composite view.

In another aspect, a method for generating a modified composite view as a function of a plurality of whole slide images and a reconstruction model includes receiving, using at least a processor, a plurality of whole slide images, registering, using a reconstruction algorithm, the plurality of whole slide images based on one or more features of at least a structure, wherein registering a first image of the plurality of whole slide images and a second image of the plurality of whole slide images comprises identifying, at least a structural continuation, using the one or more features, between the first image and the second image, and adjusting, based on the at least a structural continuation, the first image with respect to the second image, generating, using at least a reconstruction model, an initial composite view, wherein the initial composite view comprises the plurality of whole slide images, wherein generating the initial composite view comprises positioning, using one or more spatial transformations, the plurality of whole slide images into the initial composite view based on the at least a structural continuation of the one or more features of the at least a structure, and displaying, using a graphical user interface of a downstream device, the initial composite view.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating a modified composite view as a function of a plurality of whole slide images and a reconstruction model. The apparatus includes at least a computing device comprised of a processor and a memory communicatively connected to the processor. The memory instructs the processor to receive a plurality of whole slide images. The processor registers, using a reconstruction algorithm, the plurality of whole slide images based on one or more features of at least a structure, wherein registering a first image of the plurality of whole slide images and a second image of the plurality of whole slide images comprises identifying, at least a structural continuation, using the one or more features, in the first image and the second image, and adjusting, based on the at least a structural continuation, the first image with respect to the second image. The processor generates, using at least a reconstruction model, an initial composite view, wherein the initial composite view comprises the plurality of whole slide images, wherein generating the initial composite view comprises positioning, using one or more spatial transformations, the plurality of whole slide images into the initial composite view based on the at least a structural continuation of the one or more features of the at least a structure. Additionally, the processor display, using a graphical user interface of a downstream device, the initial composite view.

Figure 1:
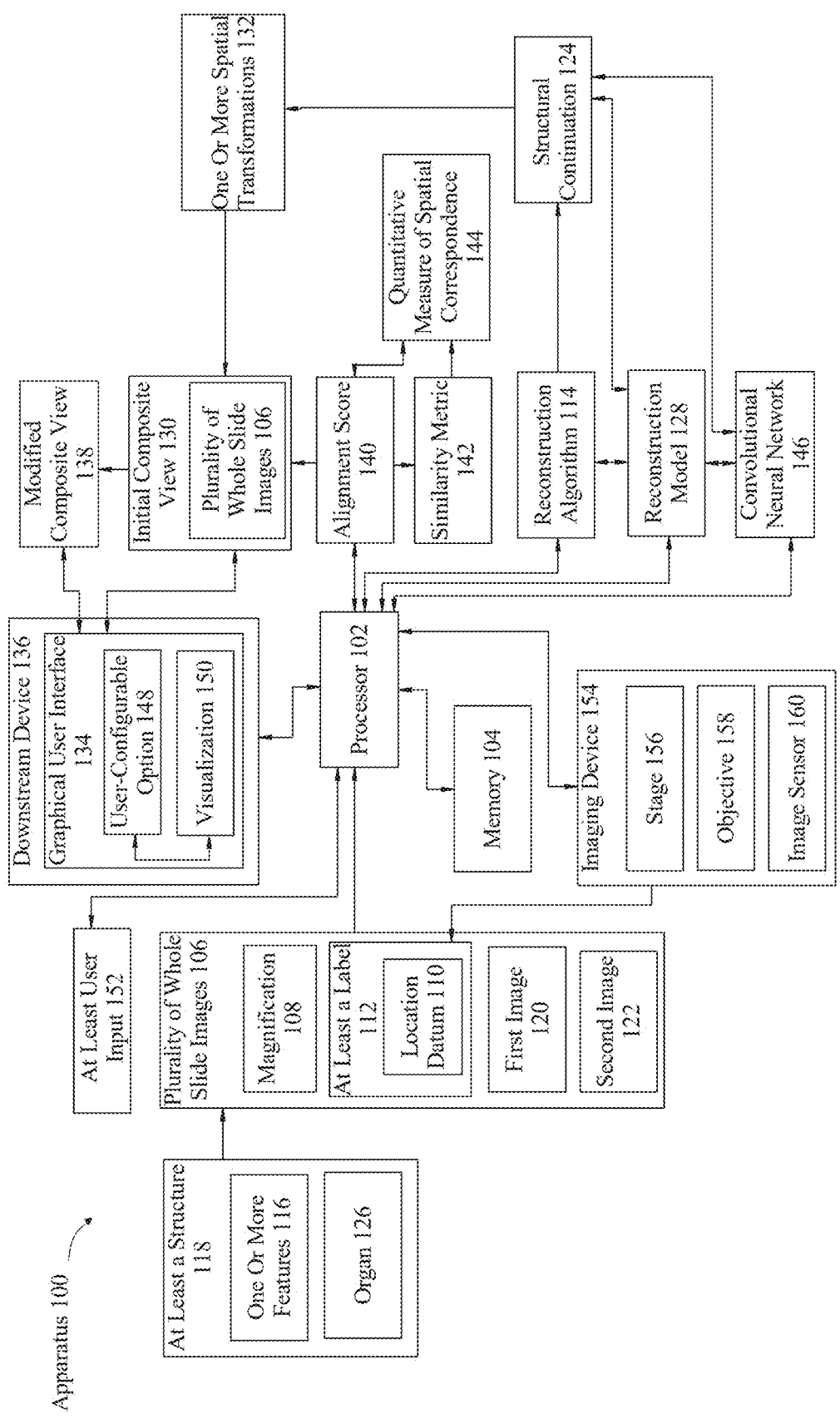
FIG. 1 is a block diagram of an apparatus for generating a modified composite view as a function of a plurality of whole slide images and a reconstruction model.

Referring now to FIG. 1, an exemplary embodiment of apparatus 100 for generating a modified composite view as a function of a plurality of whole slide images and a reconstruction model is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive a plurality of whole slide images 106. As used in this disclosure, a "whole slide image" is a digitized image that captures the entirety of a microscope slide. In an embodiment, the whole slide image may include a high-resolution digital image. In an embodiment, the whole slide image may be produced by scanning the physical slide using an automated slide scanner. Without limitation, the whole slide image may enable pathologists, researchers, and the like, to view, analyze, and share histological and/or cytological specimens in a digital format, often at various magnification 108 levels. In an embodiment, the whole slide images 106 may be used in digital pathology workflows to support diagnostic review, remote consultations, and the training of artificial intelligence algorithms. For example, without limitation the whole slide images 106 may depict a complete section of stained human tissue such as a breast biopsy, lymph node, skin lesion, and the like. In another non-limiting example, the whole slide image may include multiple tissue cores from a tissue microarray, allowing simultaneous review of different sample types. In an embodiment, whole slide images 106 may be stored in specialized formats such as SVS, NDPI, or MRXS, and may be annotated or segmented to highlight features 116 of interest, such as cell boundaries, tumor regions, morphological patterns, and the like.

With continued reference to FIG. 1, processor 102 may receive the plurality of whole slide images 106 from a remote or local image repository or database, such as a laboratory information system (LIS), picture archiving and communication system (PACS), dedicated whole slide image server, and the like. Continuing, in this example, the whole slide images 106 may be transmitted over a network using standard data communication protocols such as HTTP, HTTPS, DICOM, or a proprietary API, optionally including authentication, encryption, and compression techniques to ensure secure and efficient data transfer. In another non-limiting example, the processor 102 may be configured to receive whole slide images 106 directly and in real-time from a slide scanning device or digital microscope, such as a brightfield or fluorescence scanner. Continuing, the scanner may transmit image data to the processor 102 over a wired or wireless connection, such as USB, Ethernet, or Wi-Fi, using standard formats such as, TIFF, DICOM WSI, or device-specific drivers and interfaces. The processor 102 may be configured to perform streaming reception and processing of image tiles as they are generated, enabling near real-time rendering and analysis. In an embodiment, the processor 102 may also support cloud-based image retrieval, wherein the whole slide images 106 may be accessed from a cloud storage platform or distributed file system using secure APIs or cloud SDKs. Continuing, this may be advantageous for scalable access across multiple institutions or for integration with machine learning pipelines hosted in cloud computing environments. Without limitation, these configurations may enable the processor 102 to flexibly acquire the plurality of whole slide images 106 from a variety of sources, supporting both retrospective analysis and live image acquisition workflows.

With continued reference to FIG. 1, the plurality of whole slide images 106 may include a magnification 108 of 40×. As used in this disclosure, "magnification" is the degree by which the size of an image or object appears enlarged relative to its actual size. In an embodiment, the magnification 108 may be expressed as a multiplication factor, such as 40×, and may be used in microscopy to enable detailed observation of cellular or subcellular structures 118. In some embodiments, the plurality of whole slide images 106 may include a magnification 108 of 40×, which provides high-resolution detail suitable for diagnostic and analytical purposes, such as distinguishing cell morphology, identifying mitotic figures, or evaluating tissue architecture. The 40× magnification 108 may be obtained through optical scanning using a high-power objective 158 lens within a digital slide scanner or microscope, and the resulting digital image may retain this level of resolution for subsequent viewing, zooming, and analysis. In additional embodiments, the plurality of whole slide images 106 may include multiple magnification 108 levels, such as 10×, 20×, and 40×, either as separate image layers or as a pyramidal image structure allowing for dynamic zooming within a viewer application. In another embodiment, the magnification 108 may be user-selectable or automatically adjusted by the system based on context, such as highlighting regions of interest or matching diagnostic protocols. Without limitation, the flexibility in magnification 108 may enable more effective navigation and interpretation of digital pathology data across various clinical and research use cases.

With continued reference to FIG. 1, the plurality of whole slide images 106 may include at least a location datum 110, the location datum 110 identified using at least a label 112. As used in this disclosure, a "location datum" is a data element associated with a whole slide image that encodes a physical or anatomical reference point corresponding to where a tissue section was taken from within a larger specimen or subject. In an embodiment, the location datum 110 may enable contextual understanding of the tissue sample's origin, which may be critical for diagnostic accuracy, surgical planning, or anatomical mapping. As used in this disclosure, a "label" is an identifier that is associated with image data to provide descriptive information. For example, without limitation, the label 112 may include text string, tag, symbol, barcode, and the like. Without limitation, the descriptive information may include, anatomical origin, clinical context, experimental parameters, subject identification, date taken, and the like.

With continued reference to FIG. 1, in some embodiments, the label 112 may reflect anatomical orientation or cutting information provided by technical staff, such as "dorsal right" or "lateral left," corresponding to known positions from which tissue "chunks" were extracted. Continuing, this information may be based on procedural knowledge of how and where a larger tissue specimen was sectioned. In some embodiments, the label 112 may be included as a physical tag adhered to the microscope slide, a digital tag embedded in image metadata, or a note recorded separately in a laboratory information system or pathology report. In an embodiment, the label 112 may identify the location datum 110 which may be programmatically extracted or manually entered, and may serve to link the whole slide image to other structured or unstructured data within a diagnostic or research workflow. Without limitation, this may support enhanced traceability, spatial orientation, and correlation with imaging or clinical findings.

Still referring to FIG. 1, processor 102 is configured to register, using a reconstruction algorithm 114, the plurality of whole slide images 106 based on one or more features 116 of at least a structure 118, wherein registering a first image 120 of the plurality of whole slide images 106 and a second image 122 of the plurality of whole slide images 106 comprises identifying, a structural continuation 124, using the one or more features 116, in the first image 120 and the second image 122 and adjusting, based on the at least a structural continuation 124, the first image 120 with respect to the second image 122. As used in this disclosure, a "reconstruction algorithm" is a set of computational instructions executed by hardware or software that integrates multiple images to generate a unified representation. The reconstruction algorithm 114 may account for image distortions, positional discrepancies, variations in orientation among the images being processed, and the like. In a non-limiting example, the reconstruction algorithm 114 may be used to digitally stitch together adjacent sections of tissue from serial whole slide images 106 to form a three-dimensional tissue reconstruction. In another example, the reconstruction algorithm 114 may correct for rotation or skew between two overlapping tissue images to enable accurate comparison or fusion. As used in this disclosure, "features" are distinguishable elements within an image that may be computationally detected to support image analysis. Without limitation, the features 116 may include cell boundaries, vascular structures 118, staining intensities, tissue interfaces, morphological landmarks, and the like. For instance, features 116 in a whole slide image may include a clearly defined glandular border, a cluster of immune cells, or a specific shade of eosin staining. In another example, features 116 may be keypoints generated by a feature-detection algorithm such as SIFT or SURF that can be used to anchor alignments between images.

With continued reference to FIG. 1, as used in this disclosure, a "structure" is a defined component within a specimen that may be represented in a whole slide image. In an embodiment, the structure 118 may include anatomical, histological, or cellular components. In an embodiment, the structure 118 may be used as a spatial or diagnostic reference. Without limitation, the structures 118 may include macro-scale elements like ducts or lobules, or micro-scale components like nuclei, muscle fibers, or stroma. For example, without limitation, the structure 118 may be a portion of alveolar tissue in a lung biopsy, or a cross-section of a blood vessel in a kidney tissue sample. In some embodiments, multiple structures 118 within an image may provide a composite context for alignment or analysis. As used in this disclosure, a "first image" is one of the plurality of whole slide images 106 that serves as a reference in a registration process. As used in this disclosure, a "second image" an image from the plurality of whole slide images 106 that is to be compared relative to the first image 120. In a non-limiting example, the first image 120 may correspond to a hematoxylin and eosin (H&E)-stained section of tissue cut at a certain depth, while the second image 122 may correspond to a subsequent serial section stained for immunohistochemistry. As used in this disclosure, a "structural continuation" is a feature that suggests a progression or alignment between non-overlapping regions in adjacent tissue sections. In an embodiment, the feature may serve as an inferred anchor point or alignment cue for image registration between the first image 120 and the second image 122. For example, without limitation, the at least a structural continuation 124 may include a centroid of a lymphoid follicle that appears in approximately the same anatomical position across both slides, or a bifurcation in a ductal structure 118 that is morphologically consistent between adjacent tissue sections. In an embodiment, the structural continuation 124 may be utilized as a morphologically or spatially consistent feature that is inferred to persist across serial sections. Continuing, these features may serve as indirect anchor points to facilitate image registration, based on predicted structural progression or anatomical continuity. For example, the structural continuation 124 may include cell boundary features that exhibit comparable geometry or spatial arrangement across adjacent tissue sections. In another non-limiting example, tissue boundaries, such as those between tumor and stroma or between epithelial and connective tissue regions, may demonstrate sufficient morphological consistency to support alignment. Without limitation, additional features that may be used include vascular bifurcations or trajectories, which may retain identifiable orientations or branching patterns across non-overlapping sections and thereby assist in establishing spatial correspondence.

In some embodiments, identifying structural continuation 124 may include using machine vision. A machine vision system may use images from at least a imaging device 154, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional or two-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. An error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

With continued reference to FIG. 1, In some embodiments, the registration may include detecting identifiable features 116 within a known histological structure 118, such as a tumor margin or a connective tissue boundary, and using those features 116 to inform spatial alignment. The reconstruction algorithm 114 may then compare these features 116 across images to determine overlapping or corresponding regions. The process of registering a first image 120 and a second image 122 of the plurality of whole slide images 106 may include identifying at least one structural continuation 124 shared by both images. This structural continuation 124 may be automatically identified by the processor 102 using feature detection techniques, or may be user-annotated based on known tissue landmarks. In some embodiments, multiple structural continuations 124 may be used to increase the precision of alignment, particularly when tissue deformation or sectioning variability exists. Once the at least a structural continuation 124 is identified, the reconstruction algorithm 114 may adjust the spatial orientation, scaling, or positioning of the first image 120 relative to the second image 122 to achieve optimal alignment. Without limitation, this may include translation, rotation, or warping operations depending on the complexity of the tissue distortion or variation between the slides. The result may include a coordinated image set that allows for layered viewing, annotation, or computational analysis across serial or related tissue sections. Continuing, this registration process may support downstream applications such as three-dimensional tissue reconstruction, cross-slide comparative pathology, or multi-stain correlation. For example, without limitation, a user may toggle between H&E and immunofluorescence views of the same region of interest after registration, or analyze co-localization of cell types across different staining modalities. Without limitation, processor 102 may leverage the location of structural continuations 124 and structural features 116 to enable more meaningful interpretation of spatially distributed biological information.

With continued reference to FIG. 1, at least a processor 102 is configured to register at least a portion of second image 122 to at least a portion of first image 120 at first magnification level to derive a transformation matrix. As used in this disclosure, a "transformation matrix" is a mathematical construct used to perform geometric transformations on a given image. Exemplary geometric transformations may include, without limitation, translation, rotation, scaling, shearing, and the like. In some embodiments, during image registration, transformation matrix may be used to define, for instance, and without limitation, how one image e.g., at least a portion of second image 122 needs to be adjusted, to align with another image e.g., at least a portion of first image 120. Exemplary embodiments of transformation matrix are described in further detail below.

With continued reference to FIG. 1, in one or more embodiments, transformation matrix may include a plurality of transformation parameters to align at least a portion of second image 122 to at least a portion of first image 120 at first magnification level. "Transformation parameters," as described herein, are values used in transformation matrix to perform geometric adjustments on an image. In an embodiment, transformation parameters may include translation parameters used to shift image along a give x and y axes. In another embodiment, transformation parameters may include a rotation parameter configured to rotate image around a specific point at a specific angle of rotation. In yet another embodiment, transformation parameters may include a scaling parameter used to adjust the size of the image. In some cases, scaling may be uniform (e.g., same factor for both aces) or, in other cases, non-uniform (e.g., different factors for the x and y axes). In yet another embodiment, transformation parameters may include a shearing parameter configured to distort image by, for instance, slanting it along the x or y axis. As a person skilled in the art, upon reviewing the entirety of this disclosure, will be aware of various transformation parameters incorporated within transformation matrix.

With continued reference to FIG. 1, as a non-limiting example, a portion of candidate slide may be registered to a portion of reference slide to calculate, by at least a processor 102, a transformation matrix. Both candidate slide and reference slide may be at a baseline magnification level, for example, first magnification level which is lower than the target magnification level. In some embodiments, first magnification level may be a default magnification level of the digital slide (e.g., WSI). For example, and without limitation, the baseline magnification level may be 0.3×.

With continued reference to FIG. 1, registering a portion of second image 122 to a portion of first image 120 at first magnification level may be done using computer vision model as described above. In some cases, it may be easier for computer vision model to register portions of two slides at a low magnification level (e.g., 0.3×), than to register them at a high magnification level (e.g., 10×). For example, and without limitation, it may be hard for computer vision model to register a portion of the candidate slide to a portion of the reference slide at target magnification level in one shot, while it is relatively easy for the computer vision model to register two slides at a magnification level lower than the target magnification level (e.g., the first magnification level). However, it should be noted that transformation matrix derived by registering two slides at the lower magnification level may still be helpful to register these two slides at the high magnification level, the details of which is to be described below.

With continued reference to FIG. 1, in some embodiments, the registration may be rigid. For example, rigid registration may include affine transformation involving identification of key points (e.g., the points with gradients in two orthogonal directions) and descriptors (e.g., feature vector invariant to translation, rotation, and scale) on first region of interest on first image 120 of the reference slide and corresponding second ROI on the second image 122 of the candidate slide. Then the affine transformation may identify the correspondences by matching key points across two slides 120 and 122 using distance between descriptors. Finally, affine transformation may perform in-plane rotation, scale, skew, and translation to derive transformation matrix. For example, and without limitation, transformation matrix may include a 2×3 matrix representing 6 degrees of freedom (DoF). For the purposes of this disclosure, an "affine transformation" is a linear mapping method that preserves points, straight lines, and planes.

With continued reference to FIG. 1, as a non-limiting example, using the matched portions of the slides, at least a processor 102 may calculate one or more aforementioned transformation parameters. For instance, at least a processor 102 may determine that candidate slide needs to be shifted 10 units right and 5 units up (translation), rotated by 15 degrees (rotation), and scaled by 1.1 in both direction (scaling). At least a processor 102 may then construct, as a function of the determined transformation parameters, below transformation matrix:

$$T = \begin{bmatrix} \cos(\theta) & -\sin(\theta) & tx \\ sine(\theta) & \cos(\theta) & ty \\ 0 & 0 & 1 \end{bmatrix}$$

Wherein tx=10, ty=5, and θ=15°. People skilled in the art will appreciate that some or all information in the transformation matrix derived from registering two slides at a low magnification level (e.g., the first magnification level) may be used to register the same two slides at higher magnification levels (e.g., target magnification level). For example, the in-plane rotation degree at the first magnification level should be similar to or even same as that at the target magnification level.

With continued reference to FIG. 1, the at least a structure 118 may include an organ 126. As used in this disclosure, an "organ" is an anatomical structure 118 within a subject. In an embodiment, the organ 126 may perform one or more specific physiological functions and may be composed of multiple tissue types working in coordination. For example, without limitation, the organ 126 may be the liver, which is responsible for metabolic processing, detoxification, and bile production. In another example, an organ 126 may be the lung, which facilitates gas exchange through its alveolar structures 118. Continuing, the organs 126 may vary in complexity and may be part of a larger system, such as the cardiovascular, digestive, or endocrine systems, each contributing to the overall function and homeostasis of the organism. In an embodiment, the organ 126 may include a cell and/or just a portion of tissue.

Still referring to FIG. 1, processor 102 is configured to generate, using at least a reconstruction model 128, an initial composite view 130, wherein the initial composite view 130 comprises the plurality of whole slide images 106, wherein generating the initial composite view 130 comprises positioning, using one or more spatial transformations 132, the plurality of whole slide images 106 into the initial composite view 130 based on the at least a structural continuation 124 of the one or more features 116 of the at least a structure 118. As used in this disclosure, a "reconstruction model" is a computational model that is configured to generate a synthesized visual representation from multiple input images. In an embodiment, the reconstruction model 128 may include an algorithm or system of algorithms. In an embodiment, the reconstruction model 128 may use various forms of machine learning, image registration, feature extraction, geometric modeling, and the like to align and integrate the input images into a unified spatial context. As used in this disclosure, an "initial composite view" is a preliminary, synthesized visual representation that incorporates and aligns multiple input images into a single visual layout. In an embodiment, the multiple input images may include the plurality of whole slide images 106. In an embodiment, the initial composite view 130 may serve as a foundational image that can be further refined or manipulated for diagnostic, analytic, or visualization purposes. As used in this disclosure, a "spatial transformation" is an operation applied to image data to change a spatial component. In an embodiment, the spatial component may include the position, orientation, scale, or geometry of the image. Without limitation, the spatial transformation may include affine transformations, perspective transformations, non-linear warping, and/or other types of geometric modifications used to align images based on shared features 116 or reference points.

With continued reference to FIG. 1, the at least a reconstruction model 128 may include selecting a transformation model, choosing an appropriate similarity cost function, and applying an optimization technique. The transformation model may define how one image is spatially manipulated to align with another, which can be particularly useful in histopathology when a large tissue sample, such as a tumor, is sectioned into smaller fragments and mounted on multiple slides. In this context, a rigid or affine transformation might be employed to account for translational or rotational misalignments that occur during slide preparation. If the tissue has been distorted due to slicing or mounting processes, a deformable transformation model, possibly using B-splines or fluid-based warping, may allow for localized alignment of tissue fragments. Once a transformation model is chosen, a similarity cost function may be used to evaluate how well a transformed tissue section aligns with adjacent sections. In histopathology, since images typically come from the same staining and imaging modality such as, H&E staining, sum of squared differences (SSD) or normalized cross-correlation (NCC) might be appropriate. Continuing, these metrics may help determine the degree of alignment based on pixel intensity values and spatial features across neighboring slides. If sections are stained differently, mutual information (MI) could serve as a more robust metric, capturing statistical dependencies between intensity distributions. An optimization method may iteratively refine the transformation parameters to improve alignment accuracy. This process might start with an initial estimate, such as an approximate overlay of two tissue sections, and proceed through successive iterations where alignment is measured, parameters adjusted, and alignment re-evaluated. For example, without limitation, this may support automated digital reconstruction of a full tumor specimen from multiple slices. For instance, without limitation, given five sequential slides of a tumor, an algorithm might apply affine transformations to coarsely align them, use NCC to evaluate the overlap between features 116 like nuclei and glandular structures, and iteratively adjust the positioning until the modified composite view 138 achieves optimal alignment. Without limitation, this process may reduce the cognitive burden on pathologists, standardize tissue reconstruction, and facilitate downstream digital analysis.

With continued reference to FIG. 1, the initial composite view 130 may be generated to include a plurality of whole slide images 106, each of which may capture different portions, orientations, or modalities of a specimen or sample. The reconstruction model 128 may be implemented as software, hardware, or a combination thereof, and may be capable of synthesizing image data by aligning features 116 found across the plurality of whole slide images 106. In a non-limiting example, the reconstruction model 128 may identify and extract common anatomical landmarks or histological features 116 across the plurality of whole slide images 106. Once these shared features 116 are identified, the reconstruction model 128 may apply one or more spatial transformations 132 to align the images. The spatial transformations 132 may adjust each image's scale, rotation, and position to register the features 116 based on their spatial correspondence 144 to a structural continuation 124 or region associated with at least a structure 118 within the biological sample. Without limitation, generating the initial composite view 130 may include iteratively refining the positions of the plurality of whole slide images 106 to reduce discrepancies or misalignments between overlapping image regions. The initial composite view 130 may serve as a starting point for further operations such as segmentation, classification, annotation, or generation of a final high-resolution composite view. As used in this disclosure, a "segmentation" is a process in which a digital image, video frame, or volumetric data is divided into multiple regions. In an embodiment, the segmentation may include isolating objects, boundaries, or areas of interest for further analysis or processing. As used in this disclosure, "classification" is a process by which input data is categorized into predefined classes based on its features. In an embodiment, classification may utilize machine learning or statistical techniques. As used in this disclosure, an "annotation" is a process by which additional descriptive information is associated with data. In an embodiment, the annotation may facilitate training, validation, and/or interpretation in data processing applications.

With continued reference to FIG. 1, the spatial transformations 132 may be essential to ensure that the images are accurately positioned relative to one another to form a coherent, interpretable view. In another non-limiting example, processor 102 may use spatial transformation techniques such as rigid or non-rigid registration depending on the deformation characteristics of the sample. The resulting initial composite view 130 may provide a top-down visual layout of the sample that enables pathologists, researchers, or automated systems to efficiently interpret the spatial relationships among tissue regions, structures 118, or abnormalities across the whole slide images 106.

Still referring to FIG. 1, processor 102 is configured to display, using a graphical user interface 134 of a downstream device 136, the initial composite view 130. A "graphical user interface," as used herein, is a graphical form of user interface that allows users to interact with electronic devices. In some embodiments, GUI 134 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 134. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface 134 and an event handler may operate together to enable seamless interaction between the user and the apparatus 100. The GUI 134 serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI 134 to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI 134 subsequently updates to reflect the system's responses, such as displaying output, modifying visual elements, or providing real-time feedback. Together, the GUI 134 and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 134. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device 136 may include a data structure. As used in this disclosure, "data structure" is a way of organizing data represented in a specialized format on a computer configured such that the information can be effectively presented in a graphical user interface 134. In some cases, the data structure includes any input data. In some cases, the data structure contains data and/or rules used to visualize the graphical elements within a graphical user interface 134. In some cases, the data structure may include any data described in this disclosure. In some cases, the data structure may be configured to modify the graphical user interface 134, wherein data within the data structure may be represented visually by the graphical user interface 134. In some cases, the data structure may be continuously modified and/or updated by processor 102, wherein elements within graphical user interface 134 may be modified as a result. In some cases, processor 102 may be configured to transmit display device and or the downstream device 136 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI 134. The data structure may act as a bridge between the user's input, captured by the event handler, and the output displayed on the GUI 134, ensuring that information is handled efficiently and accurately throughout the interaction. For example, without limitation, when a user interacts with a dropdown menu in the GUI 134 to select a topic, the event handler may capture this input and accesses a data structure, such as a dictionary or tree, that maps each topic to its associated resources or actions. The data structure may retrieve the relevant information such as, text explanations, videos, or interactive exercises, and passes it back to the event handler, which may then trigger the appropriate updates to the GUI 134, such as displaying the selected topic's content. In another embodiment, the data structure may also maintain the state of the system, tracking user progress, preferences, and session history. For instance, without limitation, a hash table may store user specific configurations, such as preferred learning styles or recent activity, which the event handler references when processing interactions. The GUI 134 may then dynamically adapt to display content aligned with these configurations. This integration may ensure that user inputs 152 are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 134 (GUI) that allows users to perform actions, provide input, or engage with the apparatus 100. Interactive elements may be designed to facilitate two-way communication between the user and the system, enabling the user to influence the behavior of the apparatus or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data, such as a user's profile or quiz questions. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "downstream device" is a device that accesses and interacts with apparatus 100. For instance, and without limitation, downstream device 136 may include a remote device and/or apparatus 100. In a non-limiting embodiment, downstream device 136 may be consistent with a computing device as described in the entirety of this disclosure. Without limitation, the downstream device 136 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface to a user, wherein a user may interact with a GUI 134. In some cases, a user may view a GUI 134 through display. Additionally, or alternatively, processor 102 be connected to display device. In one or more embodiments, transmitting the initial composite view 130 may include displaying the initial composite view 130 at display device using a visual interface.

With continued reference to FIG. 1, as used in this disclosure, a "visual interface" is a digital display that presents information, options, interactive elements to users in an intuitive and visually appealing manner. In some embodiments, visual interface may include at least an interface element. As used in this disclosure, "at least an interface element" is a portion of visual interface. In a non-limiting example, at least an interface element may include, without limitation, a button, a link, a checkbox, a text entry box and/or window, a drop-down list, a slider, or any other interface element that may occur to a person skilled in the art upon reviewing the entirety of this disclosure. In some embodiments, at least an interface element may include an event handler.

With continued reference to FIG. 1, further may include generating, using the at least a processor 102, a modified composite view 138 based on an alignment score 140 associated with the initial composite view 130. As used in this disclosure, a "modified composite view" is a synthesized representation that results from refining an initial composite view 130. In an embodiment, the modified composite view 138 may include a modification which is guided by one or more computational parameters, such as an alignment score 140, to improve visual coherence, accuracy, or spatial consistency among constituent elements. As used in this disclosure, an "alignment score" is a quantitative metric that represents the degree of correspondence between multiple input data. The alignment score 140 may also be referred to as a "confidence score" or a "score" as described herein. In an embodiment, the input data may include the plurality of whole slide images 106. In an embodiment, the alignment score 140 may be used to assess the quality of the initial composite view 130 or to guide further processing steps such as image fusion, stitching, or view refinement. In a non-limiting example, the refinement may include geometric alignment adjustments, wherein spatial transformations 132 such as translation, rotation, and/or scaling are applied to individual components of the initial composite view 130 to enhance alignment accuracy based on an alignment score 140. Continuing, the transformations may help reduce misregistration artifacts and improve the visual integrity of the composite image. Without limitation, another type of refinement may involve color or intensity normalization. This may include histogram matching or dynamic range equalization across input sources, allowing for a seamless transition in lighting, contrast, and tone across the composite view. These operations may be valuable when source images originate from different devices or are captured under varying environmental conditions. In another non-limiting example, refinement may be achieved through occlusion handling, in which overlapping regions are intelligently resolved by estimating depth or confidence scores, enabling the system to decide which elements to display or suppress. Continuing, this type of refinement enhances the realism and usability of the composite view by minimizing visual clutter or redundancy. Continuing the previous non-limiting example, further refinement may include edge blending or feathering techniques applied at region boundaries to soften transitions and reduce visible seams between stitched elements. Such techniques may be used in panoramic imaging or augmented reality displays to create a more cohesive and immersive viewing experience. In an embodiment, without limitation, refinement may also involve semantic consistency adjustments, wherein object labels 112 or regions identified during segmentation or classification are reconciled across the composite view to maintain logical coherence. Without limitation, this may be critical in applications such as medical imaging, surveillance, or autonomous navigation, where accurate object representation is essential.

With continued reference to FIG. 1, wherein generating the at least an alignment score 140 may include computing a similarity metric 142 between corresponding features in the plurality of whole slide images 106 and determining a quantitative measure of spatial correspondence 144 based on the similarity metric 142. As used in this disclosure, a "similarity metric" is a computational function used to quantify the degree of resemblance between two or more data elements. Without limitation, the data elements may be the images of the plurality of whole slide images 106, such as, the first image 120 and the second image 122. In an embodiment, the similarity metric 142 may be expressed as a scalar value reflecting closeness in terms of intensity, structure 118, texture, or spatial arrangement. As used in this disclosure, "corresponding features" are identifiable elements in multiple images whose properties indicate that they represent the same visual component. In an embodiment, the multiple images may include the plurality of whole slide images 106. In an embodiment, the identifiable elements may include key points, contours, textures, anatomical structures 118, other attributes, and the like, across different whole slide images 106 or views. As used in this disclosure, a "quantitative measure of spatial correspondence" is a numerically derived indicator that reflects the extent to which spatial relationships between corresponding features are consistent across multiple image sources. Without limitation, the quantitative measure of spatial correspondence 144 may be used to evaluate registration accuracy or guide composite image synthesis.

With continued reference to FIG. 1, In a non-limiting example, computing the similarity metric 142 may involve evaluating the intensity differences between corresponding regions of two whole slide images 106 using metrics such as normalized cross-correlation, structural similarity index (SSIM), mean squared error, and the like. Without limitation, the similarity metric 142 may enable the system to numerically capture how visually or structurally alike the compared image regions are. The similarity metric 142 may provide a basis for assessing whether alignment or transformation steps have effectively harmonized the plurality of whole slide images 106. Without limitation, corresponding features may be automatically detected through image processing algorithms such as feature detectors, such as SIFT, SURF, or ORB, which may identify unique and repeatable patterns such as cell nuclei, tissue boundaries, staining artifacts, and the like. The corresponding features may be matched across the plurality of whole slide images 106 to establish point pairs or region correspondences. Once identified, the corresponding features may serve as the anchors upon which similarity metrics 142 and alignment computations are performed. In another non-limiting example, a quantitative measure of spatial correspondence 144 may be derived by analyzing the geometric distances between matched feature points after transformation or alignment. For instance, without limitation, if the corresponding features from two images align within a pre-defined spatial tolerance after registration, a high spatial correspondence 144 score may be assigned. Additionally and/or alternatively, statistical methods such as root mean square error (RMSE) or mutual information may be employed to produce a single scalar value summarizing overall spatial alignment fidelity. Continuing the previous non-limiting example, the system may use the similarity metric 142 and spatial correspondence 144 measure to determine whether additional refinement or correction is required in generating a composite or modified composite view 138. A low similarity metric 142 or poor spatial correspondence 144 score may trigger iterative realignment processes or invoke different transformation models to improve image consistency. Without limitation, the system may ensure that the final output view maintains both visual quality and structural accuracy across its constituent components.

With continued reference to FIG. 1, wherein generating the modified composite view 138 may include conditionally refining, using the at least a reconstruction model 128, the initial composite view 130 by identifying, using a convolutional neural network 146, the at least a structural continuation 124 of the one or more features 116 across the plurality of whole slide images 106 and aligning, using the convolutional neural network 146, the at least a structural continuation 124. As used in this disclosure, a "convolutional neural network" is a class of deep learning model structured to process data with a grid-like topology. In an embodiment, the convolutional neural network 146 may process images, such as the plurality of whole slide images 106, by applying a series of convolutional, activation, and/or pooling operations to automatically learn and extract hierarchical feature representations from the input data for tasks such as classification, detection, segmentation, or alignment. In an embodiment, generating the modified composite view 138 may include conditionally refining the initial composite view 130 using at least a reconstruction model 128, where the refinement may be guided by feature alignment. In a non-limiting example, the refinement process may involve identifying a structural continuation 124 among one or more features 116 across a plurality of whole slide images 106. Without limitation, the convolutional neural network 146 may be used for this purpose, leveraging its capability to extract and compare complex image features 116 such as tissue patterns, cellular structures 118, morphological contours, and the like. Without limitation, the convolutional neural network 146 may be configured to scan each of the whole slide images 106 to detect spatially coherent and visually distinctive features 116 that are shared across the dataset. The convolutional neural network 146 may apply learned filters at multiple levels of abstraction to identify candidate regions representing the at least a structural continuation 124, a specific anatomical landmark, staining artifact, or structural boundary, appearing across the different image sources. In another non-limiting example, once the at least a structural continuation 124 has been identified in the plurality of whole slide images 106, the convolutional neural network 146 may be employed to compute the transformations needed to align these points with respect to each other. This alignment may include translations, rotations, scaling operations, and the like that bring the corresponding features into geometric concordance. The result may include a more precisely refined composite view in which shared features 116 across input images are registered into a unified visual framework. Continuing the previous non-limiting example, the output from the convolutional neural network 146 may feed into the reconstruction model 128, which may synthesize the modified composite view 138 by blending or warping input regions based on the aligned features 116. This approach may ensure that the modified composite view 138 is not only visually seamless but also spatially accurate, reflecting biologically or clinically relevant correspondences within the tissue samples.

With continued reference to FIG. 1, the convolutional neural network 146 may be trained using a labeled dataset composed of paired or multiple whole slide images 106 of similar tissue regions, where each image pair is annotated with ground-truth locations of corresponding anatomical or structural features 116. Continuing, these annotations may indicate the spatial coordinates of structural continuations 124, such as cell nuclei, tissue boundaries, glandular formations, or vessel junctions, which are known to appear across different WSIs due to serial sectioning, staining variations, or imaging from adjacent slices. Without limitation, the training data may include synthetic image pairs generated through controlled transformations, such as affine or elastic distortions, applied to base WSIs to simulate spatial misalignments. These synthetic pairs, combined with their known transformation parameters or correspondence maps, can be used to supervise the CNN's 146 learning of spatial feature detection and alignment capabilities. Additionally and or alternatively, augmentation techniques such as rotation, scaling, contrast adjustment, and noise addition may be employed to enhance the network's robustness to real-world variability in slide preparation and scanning. In another non-limiting example, the CNN 146 architecture may be trained in a supervised or self-supervised manner. In supervised training, the loss function may be defined in terms of mean squared error (MSE) between predicted and ground-truth feature locations, or as a feature matching loss based on descriptor similarity. In self-supervised training, contrastive learning or consistency-based objectives may be used to encourage the network to produce similar feature representations for matching regions across different WSIs, even without explicit correspondence labels. Continuing the previous non-limiting example, the output of the trained CNN 146 may include heatmaps indicating high-probability locations of structural continuations 124, or transformation parameters that align detected features 116. The performance of the CNN 146 may be validated using metrics such as keypoint localization accuracy, average alignment error, or image registration quality. Without limitation, the trained CNN 146 may be a central component of the reconstruction pipeline, enabling refined alignment and synthesis of modified composite views 138 from diverse and complex histological datasets.

With continued reference to FIG. 1, displaying, using the graphical user interface 134 of the downstream device 136, one or more of the initial composite view 130 and the modified composite view 138, wherein the graphical user interface 134 may include a user-configurable option 148, wherein the user-configurable option 148 is configured to re-identify, using a visualization 150 in the graphical user interface 134, the at least a structural continuation 124 of the first image 120 and the second image 122. As used in this disclosure, a "user-configurable option" is an interactive element within the graphical user interface 134 that allows a user to modify a system parameter or behavior. In an embodiment, the modification may be according to the user's preferences or task-specific needs. Without limitation, the modification may enable tailored operation of the system's functionality. As used in this disclosure, a "visualization" is a graphical representation of data that is rendered on a display device. In an embodiment, the visualization 150 may be structured in a manner that facilitates human interpretation, comparison, or interaction. In an embodiment, the visualization 150 may incorporate overlays, markers, or spatial transformations 132 for enhanced clarity and insight.

With continued reference to FIG. 1, the graphical user interface 134 may be configured to display one or both of the initial composite view 130 and the modified composite view 138, with a user-configurable option 148 that enables manual re-identification of a structural continuation 124 across image datasets. In a non-limiting example, the visualization 150 may present two whole slide images 106, such as a first image 120 and a second image 122, side by side in a dual-pane layout, each image occupying its own resizable viewing frame. Continuing, the user may pan, zoom, and/or rotate the views independently or in a synchronized fashion to orient both images to similar spatial positions. Without limitation, the visualization 150 may include a shared coordinate grid, dynamic scalebars, visual aids like crosshairs or ghost overlays, and the like to help the user assess spatial alignment. The user-configurable option 148 may be implemented as a toggle button, drop-down selector, or interactive mode-switching icon within the graphical user interface 134. When activated, the interface may enter a "registration mode," allowing the user to identify and manually mark the at least a structural continuation 124, such as a unique tissue landmark, cellular structure 118, and/or morphological boundary, in each of the displayed images. In another non-limiting example, the marking tool may include a precision pin, circle selector, or crosshair cursor that the user can place directly on the identified region in each image. Continuing, as the user selects the corresponding point in the first image 120 and then in the second image 122, the interface may visually link the two with a line or color-coded annotation, confirming the correspondence. Additionally and/or alternatively, the software may calculate and display the distance between selected points. In an embodiment, the system may provide a real-time update to the alignment preview. Continuing the previous non-limiting example, once the at least a structural continuations 124 have been identified and confirmed, the system may optionally allow the user to refine the alignment using local adjustments, such as nudging or rotating images, and then submit the selected points to a registration module for recalculating the alignment parameters of the composite view. The updated output may be reflected in the modified composite view 138, which may then replace or appear adjacent to the previous view for comparison and final approval.

With continued reference to FIG. 1, wherein generating the modified composite view 138 further may include refining, using at least user input 152 received through the graphical user interface 134 of the downstream device 136, the initial composite view 130. As used in this disclosure, "user input" is data, commands, or interactions provided by an operator through one or more input mechanisms of a graphical user interface 134. In an embodiment, the user input 152 may include mouse clicks, touchscreen gestures, keyboard entries, voice commands, and the like, which may be processed by the system to influence, guide, or modify computational operations, visual outputs, or decision-making workflows. In a non-limiting example, the graphical interface may present the user with a dual-pane display of the initial composite view 130 and one or more original whole slide images 106. The interface may include interactive tools, such as drag handles, alignment guides, rotation dials, and zoom controls, that allow the user to make fine-grained adjustments to spatial alignment or feature positioning. Without limitation, the user may engage with this manual refinement process by selecting misaligned areas or incorrectly overlaid structures 118 and manually shifting them to correct locations. The graphical interface may support real-time visual feedback, showing the immediate effect of each adjustment, and may also offer "snap-to" or magnification 108 features to assist in high-precision tasks. Users might also adjust parameters such as transparency, overlay blending, or grid display to better assess alignment quality. In another non-limiting example, the manual refinement process may also include re-identifying or confirming structural continuations 124 across images, especially in cases where automated alignment was insufficient. Users may place or reposition annotation pins or markers, adjust feature boundaries, or highlight regions of interest for reprocessing. Each action may be logged or tracked in an adjustment history, allowing undo/redo operations or batch reapplication of corrections. Continuing the previous non-limiting example, once the manual refinement is completed, the system may update the transformation model or alignment parameters and generate a modified composite view 138 that reflects the user-guided improvements. Without limitation, this refined output may be stored, exported, or used as an input for further processing, analysis, or diagnostic workflows, ensuring that domain-specific expertise contributes directly to the final data quality.

With continued reference to FIG. 1, further may include an imaging device 154, wherein the imaging device 154 may include a stage 156, objective 158, and image sensor 160, and wherein the at least a processor 102 is further configured to communicate with the imaging device 154 to capture the plurality of whole slide images 106 and receive, from the imaging device 154, the plurality of whole slide images 106. As used in this disclosure, a "stage" is a platform of an imaging device 154 upon which a specimen slide is placed. As used in this disclosure, a "slide" is a flat, typically rectangular substrate on which a specimen is mounted and prepared for examination or imaging. In an embodiment, the rectangular substrate may include glass, plastic, and the like. In an embodiment, the slide may include biological specimen samples. In an embodiment, the slide may be positioned on the stage 156 of an imaging device 154 for capturing whole slide images 106. In an embodiment, the stage 156 may be mechanically controlled. In an embodiment, the stage 156 may be capable of precise movements along one or more axes such as, X, Y, and optionally Z, to position different regions of the specimen under an objective 158 lens for image acquisition. As used in this disclosure, an "objective" is an optical component of an imaging device 154. In an embodiment, the objective 158 may include one or more lenses, that is positioned above the stage 156 and configured to magnify or focus light from a sample area of the specimen slide onto an image sensor 160 for high-resolution imaging. As used in this disclosure, an "image sensor" is an electronic component that converts optical signals into digital data by capturing light transmitted through a specimen. In an embodiment, the image sensor 160 may include using technologies such as CCD (charge-coupled device) or CMOS (complementary metal-oxide-semiconductor), and generating digital images for processing or storage. In a non-limiting example, the stage 156 may be a precision-controlled motorized platform capable of moving a mounted whole slide glass specimen incrementally across the imaging field. Continuing, this movement may allow the device to systematically scan the entire area of interest in a raster or serpentine pattern, capturing tiled images of each region for subsequent reconstruction into a whole slide image. Without limitation, positioned above the stage 156 may be the objective 158, which may include interchangeable lenses offering various magnification 108 levels such as, 10×, 20×, 40×. The objective 158 may focus the transmitted or reflected light from the sample onto the underlying image sensor 160 with high clarity and spatial resolution. The quality of the optical path and magnification 108 choice may directly influence the level of detail captured in the resulting images, which is critical for applications such as histopathological analysis or cellular imaging. In another non-limiting example, the image sensor 160 may receive the focused optical signal and converts it into a digital image. Without limitation, the image sensor 160 may be configured with specific resolution, frame rate, and sensitivity characteristics suitable for the biological specimen and imaging modality. The captured image data from each tile or region is compiled by the system to form a high-resolution whole slide image representing the entire specimen. Continuing the previous non-limiting example, the at least a processor 102 of the system may be configured to communicate with the imaging device 154 to control the scanning parameters, such as stage 156 movement speed, focus adjustment, and exposure settings. The processor 102 may also receive the captured image data in real time or as a batch process and store, preprocess, or analyze the plurality of whole slide images 106 for further steps in alignment, registration, composite view generation, or downstream diagnostics.

Figure 2:
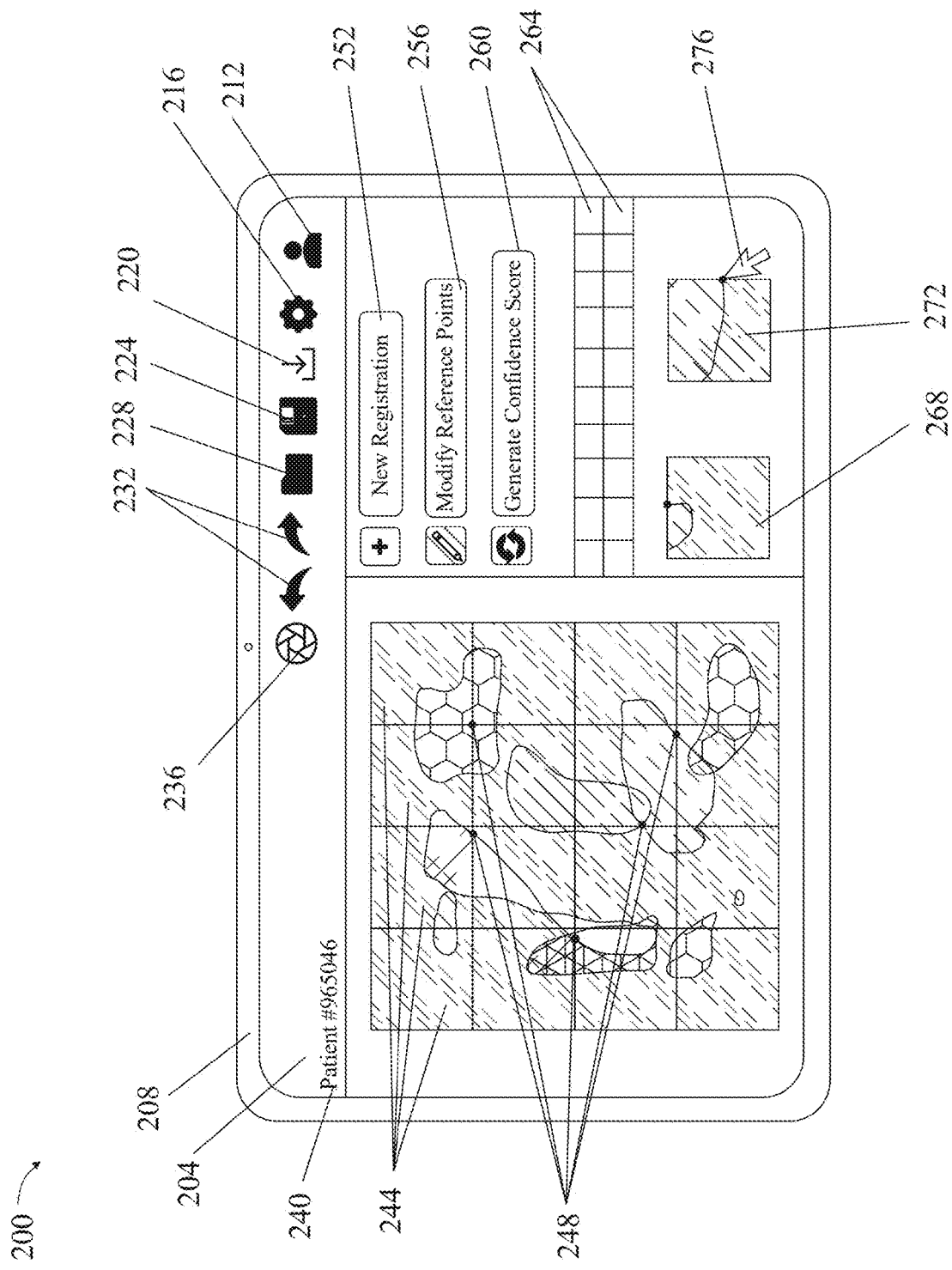
FIG. 2 is an exemplary illustration of a graphical user interface.

Referring now to FIG. 2, an exemplary illustration 200 of a graphical user interface. In an embodiment, the graphical user interface (GUI) 204 may be displayed on a downstream device 208. In an embodiment, the downstream device 208 may include a smartphone, tablet, or computer. In an embodiment, the GUI 204 may include a user profile icon 212. In an embodiment, the user profile icon 212 may serve as an interactive element that allows users to access and manage their personal account settings. In an embodiment, the user profile icon 212 may provide a direct link to the user's profile, where they may update personal information, review activity history, and configure preferences related to their interactions within the system. In an embodiment, the user profile icon 212 may enable users to modify details such as their name, contact information, medical history, or security settings. In an embodiment, the user profile icon 212 may serve as a gateway to account-related features, including login credentials, privacy controls, and system permissions. In an embodiment, the user profile icon 212 may support multi-user functionality, allowing different users to switch profiles or customize their experience within the same system. In an embodiment, the user profile icon 212 may incorporate a visual indicator, such as a profile picture placeholder, initials, or a silhouette, providing a recognizable representation of the user. In an embodiment, the user profile icon 212 may include a notification badge, alerting users to profile-related updates, messages, or required actions. In an embodiment, the user profile icon 212 may facilitate seamless user management and personalization within the GUI 204. In an embodiment, the GUI 204 may include a gear icon 216. The GUI 204 may incorporate a gear icon 216, which may provide access to system settings, allowing users to customize preferences, adjust configurations, or manage administrative controls.

In an embodiment, the GUI 204 may include a download button 220. The download button 220 may be configured to allow the user to download image data, composite views, or analysis reports to a local storage location. Visually, the download button 220 may appear as a downward-pointing arrow icon, often located in the top toolbar, and may open a file dialog box for destination selection upon activation.

In an embodiment, the GUI 204 may include a save button 224. In an embodiment, the save button 224 may be configured to store current workspace data, including modified composite views, user-defined annotations, or selected registration points, either locally or to a network location. The save button 224 may appear as a disk icon or a labeled rectangular button in the interface, providing visual feedback such as a checkmark upon successful save.

In an embodiment, the GUI 204 may include an open folder 228. The open folder 228 may allow the user to navigate to and load previously saved projects, image datasets, or workspaces. In the graphical interface, the open folder 228 may be represented by a folder icon that, when clicked, launches a file explorer window or a list of recent projects.

In an embodiment, the GUI 204 may include an undo/redo button 232. The undo/redo button 232 may allow the user to sequentially reverse or reapply recent actions, such as point placements, alignment adjustments, or image edits. The buttons may be shown as left- and right-curving arrows, often near the top or bottom of the GUI, and may include tooltip text or keyboard shortcuts.

In an embodiment, the GUI 204 may include a capture button 236. The capture button 236 may be configured to trigger a screenshot or export of the current visual display, such as a zoomed-in region of the modified composite view or a comparative alignment view. It may appear as a camera icon or labeled "Capture," and may offer options for image format and resolution.

In an embodiment, the GUI 204 may include workspace identifier 240. The workspace identifies 240 may include a tissue sample number, patient identification number, timestamp, or project ID, and may serve to visually anchor the user's current context. This workspace identifier 240 may appear in a status bar or title bar and may be displayed as a text label, often in bold or a distinct color.

In an embodiment, the GUI 204 may include a plurality of whole slide images 244. The plurality of whole slide images 244 may be displayed side by side, stacked, or in tabbed panels, allowing for comparative visualization, alignment, and annotation. Each image panel may include zoom and navigation tools, as well as identifiers to distinguish between different sample slides.

In an embodiment, the GUI 204 may include structural continuations 248. The structural continuations 248 may include user-placed or system-detected markers that identify corresponding anatomical landmarks across the plurality of whole slide images. These may be represented visually by pins, circles, or crosshairs in each image window and may be color-coded or numbered for clarity.

In an embodiment, the GUI 204 may include a new registration button 252. The new registration button 252 may initiate a registration workflow, resetting existing transformations and prompting the user to select new structural continuations or initiate an automated alignment. It may be represented as a button labeled "Start New Registration" and may appear prominently when misalignment is detected. In an embodiment, the GUI 204 may include modify reference points button 256. In an embodiment, the modify reference points button 256 may allow users to edit, delete, or reposition previously identified reference points used in composite view generation. This button may appear as a pin icon with a pencil overlay and may activate an edit mode in the image viewer. In an embodiment, the GUI 204 may include a confidence score generator 260. In an embodiment, the confidence score generator 260 may include a numerical or graphical display indicating the system's level of certainty in the alignment or registration accuracy of the composite view, based on factors such as feature similarity, spatial correspondence, or user confirmation. Visually, it may appear as a colored bar, percentage readout, or heatmap overlay on the image, with color codes (e.g., green for high confidence, red for low) to guide user interpretation. In an embodiment, the GUI 204 may include a slide view toggle 264. In an embodiment, the slide view toggle 264 may include a user-selectable interface component configured to allow the user to switch between or select from among a plurality of whole slide images, each representing a different tissue section, stain, or imaging modality. The slide view toggle 264 may appear as a scrollable carousel, drop-down menu, tab bar, or grid of thumbnail previews, each labeled with identifiers such as slide number, tissue type, or acquisition date. Without limitation, the slide view toggle 264 may dynamically update the image viewing window to display the selected whole slide image, and may support synchronized viewing when multiple slides are selected for comparative analysis. In a non-limiting example, a user may click on a thumbnail labeled "Slide 3—H&E Stain" and instantly view that slide in the primary display pane, replacing or supplementing the previously viewed image. This functionality enables efficient navigation across datasets and facilitates tasks such as registration, annotation, and diagnostic review. In an embodiment, the GUI 204 may include a first image 268. In an embodiment, the first image 268 may include a high-resolution representation of a whole slide image, rendered in a dedicated viewport within the GUI. The first image 268 may feature scroll, zoom, and annotation capabilities, and may be labeled or bordered with identifiers such as "Image A" or "Reference Slide" to help distinguish it during comparative analysis. In an embodiment, the GUI 204 may include a second image 272. In an embodiment, the second image 272 may include another high-resolution whole slide image intended for comparison, alignment, or registration with the first image 268. The second image 272 may be displayed in a separate or adjacent viewport, and may also support synchronized zooming and panning, allowing users to visually compare regions of interest across the two images. In an embodiment, the GUI 204 may include a curse 276. In an embodiment, the curser 276 may include a mouse-controlled or touch-controlled pointer that enables the user to interact with elements in the GUI, such as placing structural continuations, selecting tools, or navigating the image. The cursor 276 may change appearance depending on context, such as switching from an arrow to a crosshair when in annotation mode, or to a hand icon when dragging the image, providing visual feedback about the current tool or action.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 3:
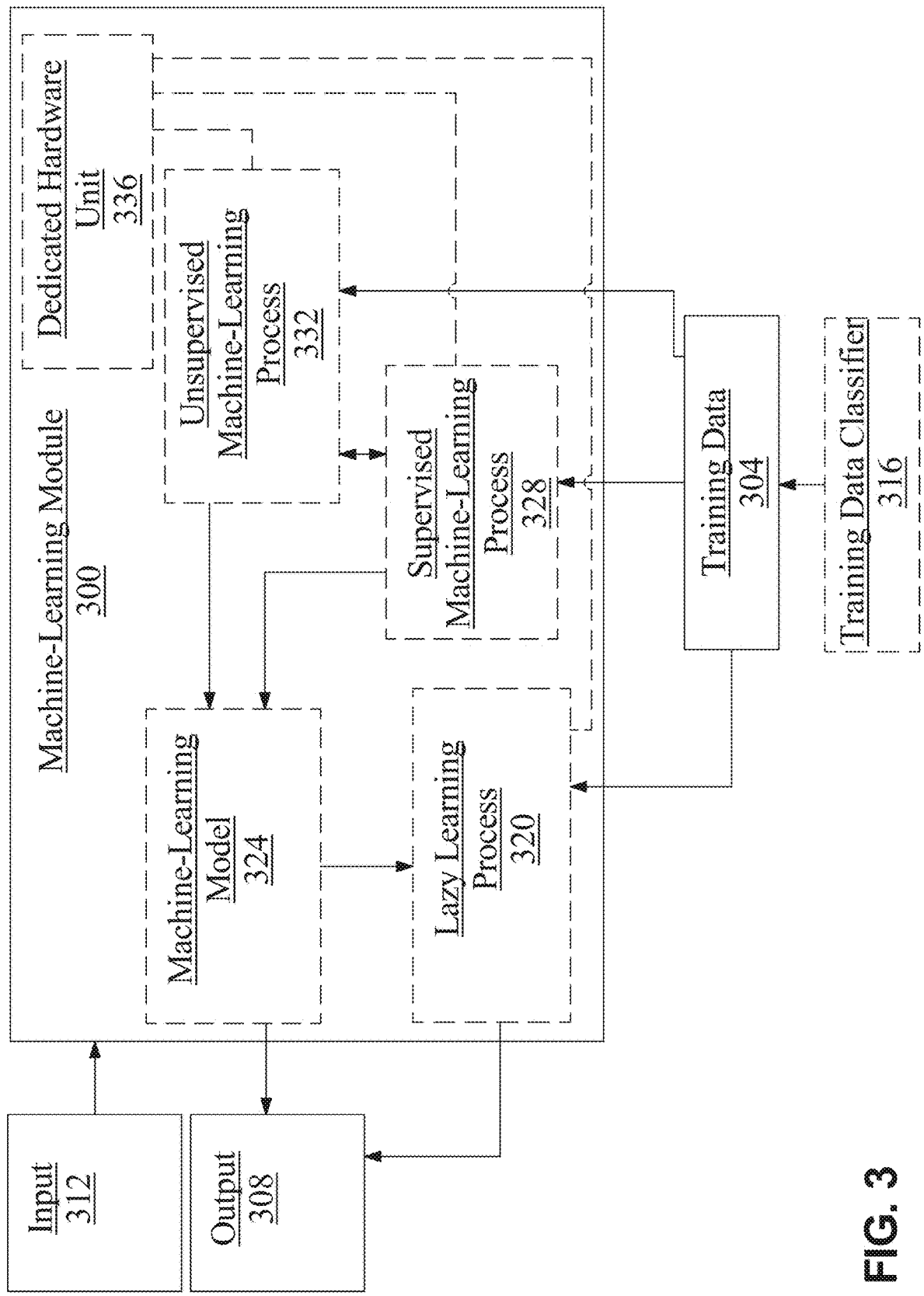
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include the plurality of whole slide images and outputs may include an initial composite view and/or a modified composite view.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to one or more diagnostic subtypes, tissue morphologies, patient cohorts, or molecular phenotypes that characterize a sub-population, such as a cohort of persons and/or other analyzed items and/or phenomena for which a subset of training data may be selected Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include the plurality of whole slide images as described above as inputs, the initial composite view and/or the modified composite view as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
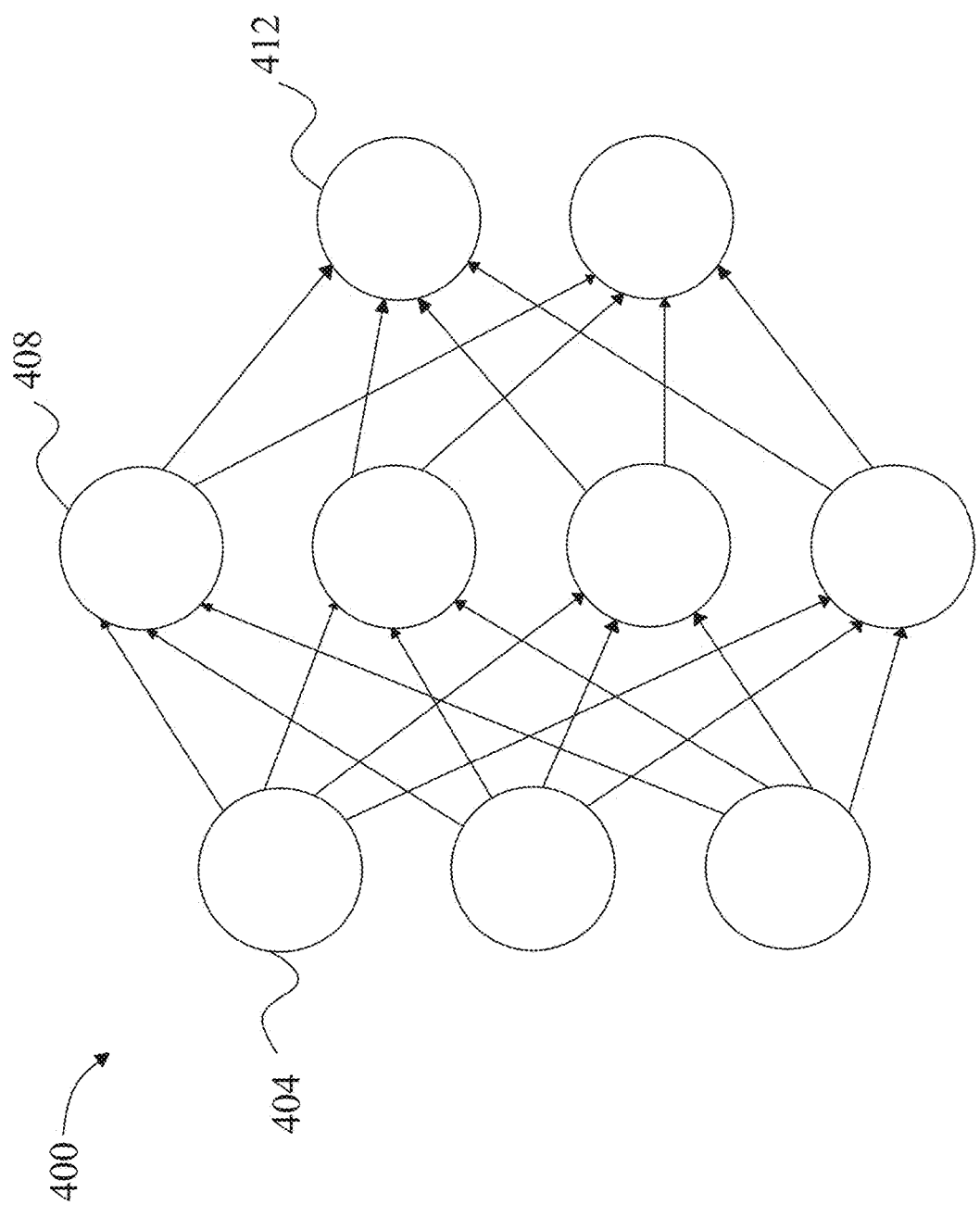
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
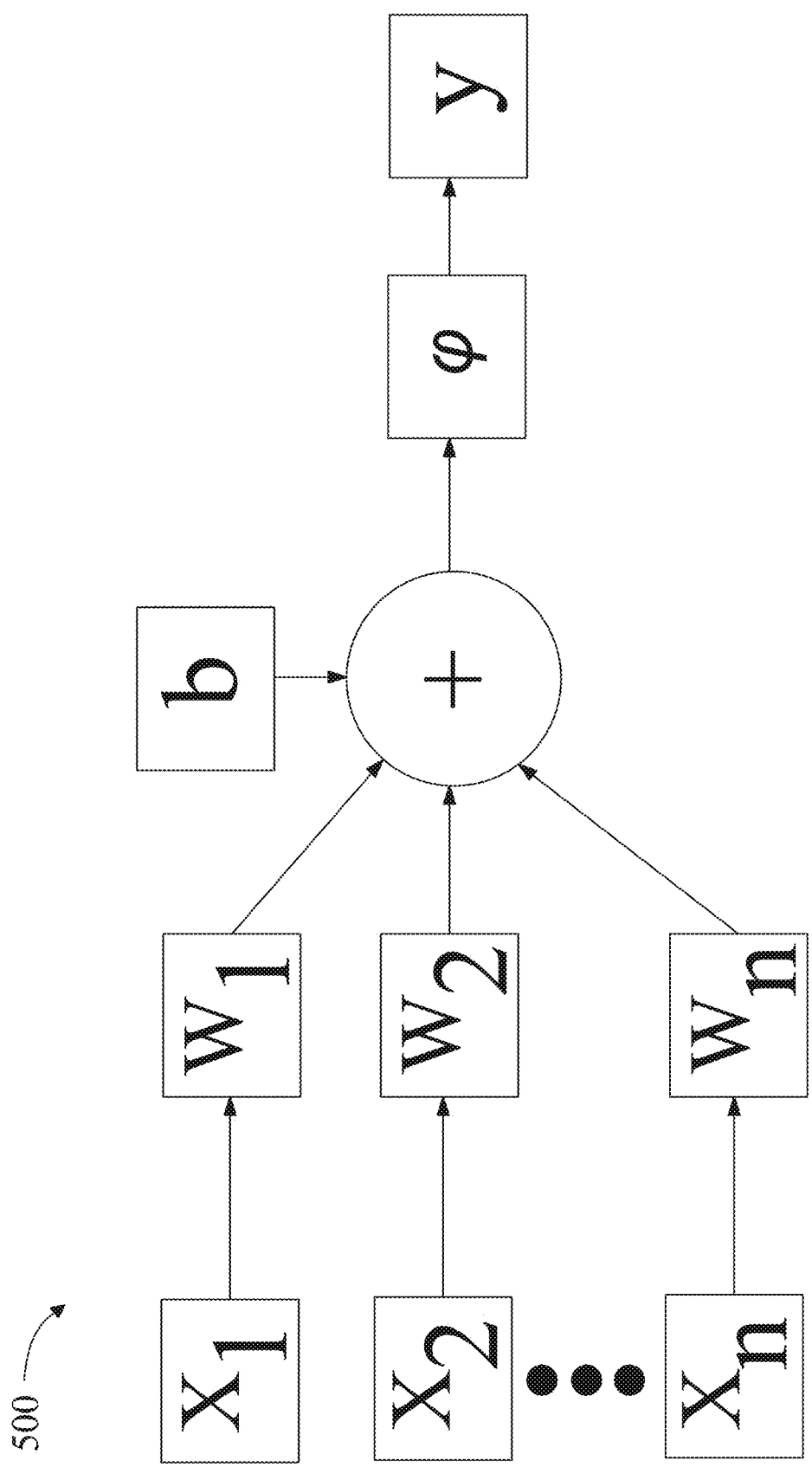
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
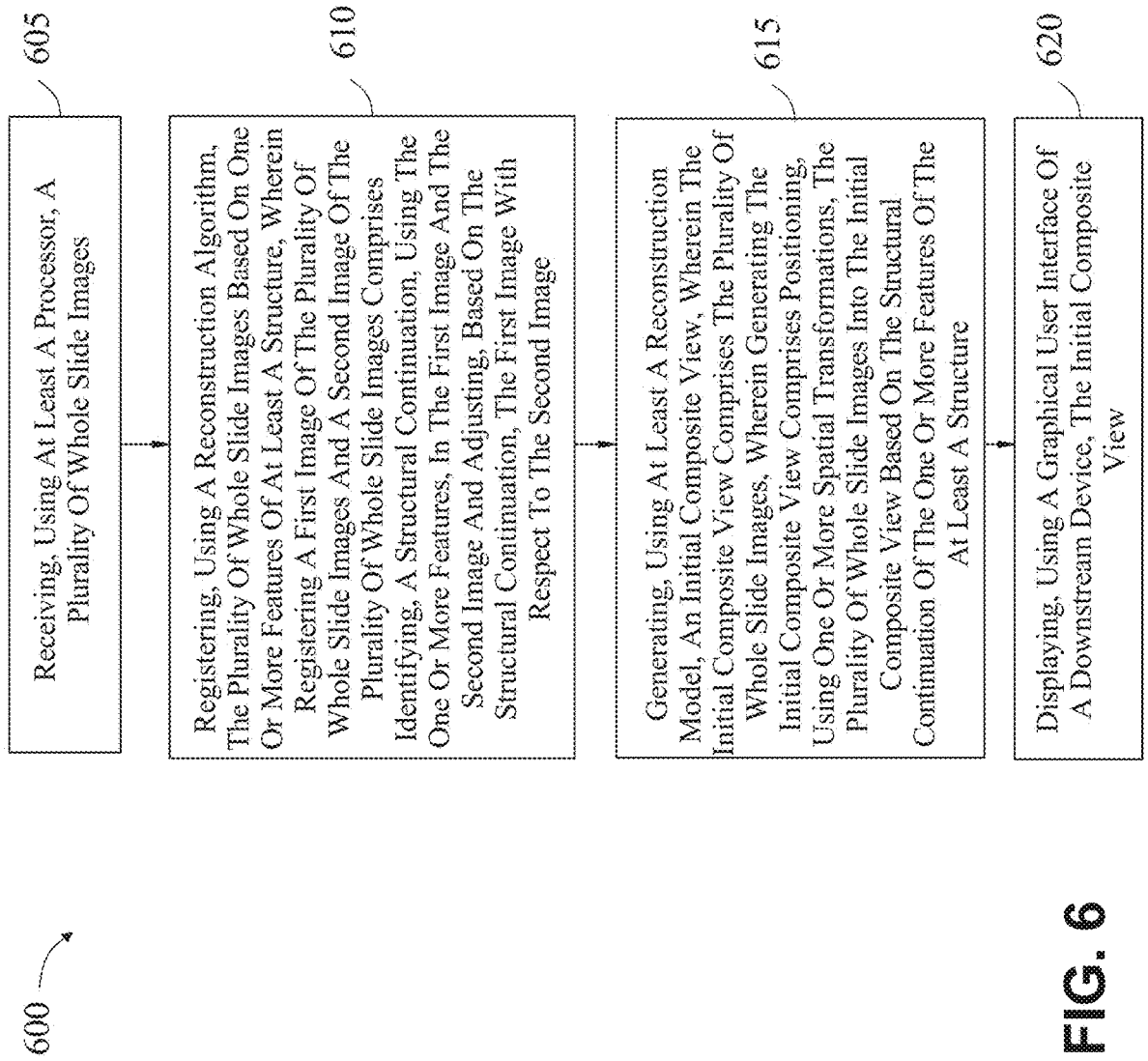
FIG. 6 is a block diagram of an exemplary method for generating a modified composite view as a function of a plurality of whole slide images and a reconstruction model.

Referring now to FIG. 6, a flow diagram of an exemplary method 600 for generating a modified composite view as a function of a plurality of whole slide images and a reconstruction model is illustrated. At step 605, method 600 includes receive, using the at least a processor, a plurality of whole slide images. In an embodiment the plurality of whole slide images may include a magnification of 40×. In an embodiment the plurality of whole slide images may include at least a location datum, the location datum identified using at least a label. This may be implemented as described and with reference to FIGS. 1-5.

Still referring to FIG. 6, at step 610, method 600 includes register, using a reconstruction algorithm, the plurality of whole slide images based on one or more features of at least a structure, wherein registering a first image of the plurality of whole slide images and a second image of the plurality of whole slide images comprises identifying, a structural continuation, using the one or more features, in the first image and the second image and adjusting, based on the at least a structural continuation, the first image with respect to the second image. In an embodiment the at least a structure may include an organ. This may be implemented as described and with reference to FIGS. 1-5.

Still referring to FIG. 6, at step 615, method 600 includes generate, using at least a reconstruction model, an initial composite view, wherein the initial composite view comprises the plurality of whole slide images, wherein generating the initial composite view comprises positioning, using one or more spatial transformations, the plurality of whole slide images into the initial composite view based on the at least a structural continuation of the one or more features of the at least a structure. This may be implemented as described and with reference to FIGS. 1-5.

Still referring to FIG. 6, at step 620, method 600 includes display, using a graphical user interface of a downstream device, the initial composite view. In an embodiment further may include generating, using the at least a processor, a modified composite view based on an alignment score associated with the initial composite view. In an embodiment wherein generating the at least an alignment score may include computing a similarity metric between corresponding features in the plurality of whole slide images and determining a quantitative measure of spatial correspondence based on the similarity metric. In an embodiment wherein generating the modified composite view may include conditionally refining, using the at least a reconstruction model, the initial composite view by identifying, using a convolutional neural network, the at least a structural continuation of the one or more features across the plurality of whole slide images and aligning, using the convolutional neural network, the at least a structural continuation. In an embodiment displaying, using the graphical user interface of the downstream device, one or more of the initial composite view and the modified composite view, wherein the graphical user interface may include a user-configurable option, wherein the user-configurable option is configured to re-identify, using a visualization in the graphical user interface, the at least a structural continuation of the first image and the second image. In an embodiment wherein generating the modified composite view further may include refining, using at least user input received through the graphical user interface of the downstream device, the initial composite view. In an embodiment further may include an imaging device, wherein the imaging device comprises a stage, objective, and image sensor, and wherein the at least a processor is further configured to communicate with the imaging device to capture the plurality of whole slide images and receive, from the imaging device, the plurality of whole slide images. This may be implemented as described and with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
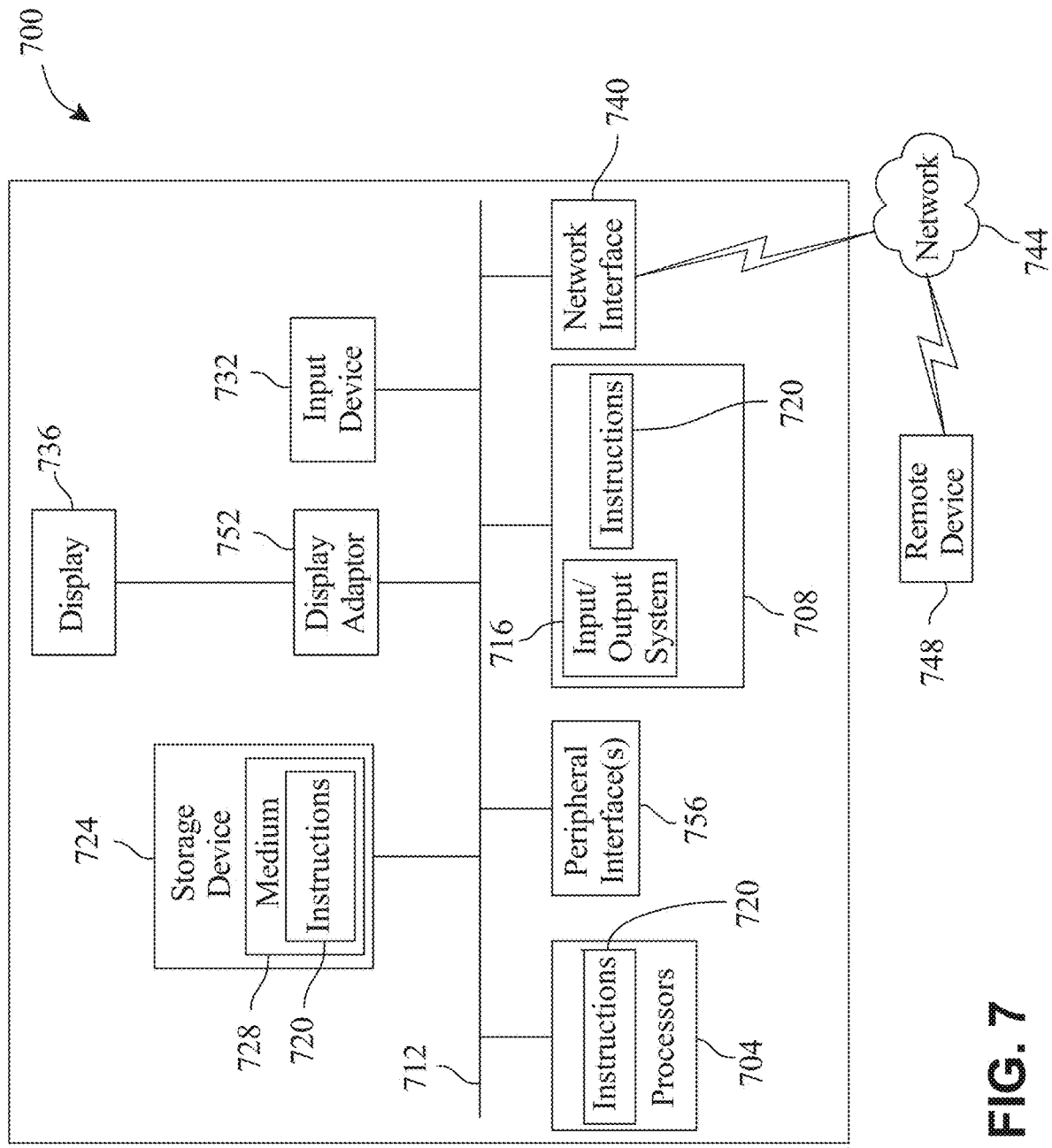
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a modified composite view as a function of a plurality of whole slide images and a reconstruction model, wherein the apparatus comprises: at least a computing device, wherein the computing device comprises:
a memory; and
at least a processor communicatively connected to the memory, wherein the memory contains instructions configuring the at least a processor to:
receive, using the at least a processor, a plurality of whole slide images;
register, using a reconstruction algorithm, the plurality of whole slide images based on one or more features of at least a structure, wherein registering a first image of the plurality of whole slide images and a second image of the plurality of whole slide images comprises:
identifying at least a structural continuation, using the one or more features, between the first image and the second image; and
adjusting, based on the at least a structural continuation, the first image with respect to the second image;
generate, using at least a reconstruction model, an initial composite view, wherein the initial composite view comprises the plurality of whole slide images, wherein generating the initial composite view comprises:
positioning, using one or more spatial transformations, the plurality of whole slide images into the initial composite view based on the at least a structural continuation of the one or more features of the at least a structure; and
display, using a graphical user interface of a downstream device, the initial composite view.

2. The apparatus of claim 1, wherein the at least a structure comprises an organ.

3. The apparatus of claim 1, further comprising generating, using the at least a processor, a modified composite view based on an alignment score associated with the initial composite view.

4. The apparatus of claim 3, wherein generating the at least an alignment score comprises:
computing a similarity metric between corresponding features in the plurality of whole slide images; and
determining a quantitative measure of spatial correspondence based on the similarity metric.

5. The apparatus of claim 1, wherein registering, using the reconstruction algorithm, the plurality of whole slide images based on one or more features of at least a structure comprises:
identifying, using a convolutional neural network, the at least a structural continuation of the one or more features across the plurality of whole slide images; and
aligning, using the convolutional neural network, the at least a structural continuation.

6. The apparatus of claim 1, wherein the graphical user interface of the downstream device comprises a user-configurable option, wherein the user-configurable option is configured to receive a user input that re-identifies, as a function of a visualization in the graphical user interface, the at least a structural continuation of the first image and the second image.

7. The apparatus of claim 6, wherein generating the modified composite view further comprises refining, using at least user input received through the graphical user interface of the downstream device, the initial composite view.

8. The apparatus of claim 1, wherein the plurality of whole slide images comprises at least a location datum, wherein the location datum is identified using at least a label.

9. The apparatus of claim 1, wherein the plurality of whole slide images comprises images having a magnification of 40×.

10. The apparatus of claim 1, further comprising an imaging device, wherein the imaging device comprises a stage, objective, and image sensor, and wherein the at least a processor is further configured to:
communicate with the imaging device to capture the plurality of whole slide images; and
receive, from the imaging device, the plurality of whole slide images.

11. A method for generating a modified composite view as a function of a plurality of whole slide images and a reconstruction model, wherein the method comprises:
receiving, using at least a processor, a plurality of whole slide images;
registering, using a reconstruction algorithm, the plurality of whole slide images based on one or more features of at least a structure, wherein registering a first image of the plurality of whole slide images and a second image of the plurality of whole slide images comprises:
identifying, at least a structural continuation, using the one or more features, between the first image and the second image; and
adjusting, based on the at least a structural continuation, the first image with respect to the second image;
generating, using at least a reconstruction model, an initial composite view, wherein the initial composite view comprises the plurality of whole slide images, wherein generating the initial composite view comprises:
positioning, using one or more spatial transformations, the plurality of whole slide images into the initial composite view based on the at least a structural continuation of the one or more features of the at least a structure; and
displaying, using a graphical user interface of a downstream device, the initial composite view.

12. The method of claim 11, wherein the at least a structure comprises an organ.

13. The method of claim 11, further comprising generating, using the at least a processor, a modified composite view based on an alignment score associated with the initial composite view.

14. The method of claim 13, wherein generating the at least an alignment score comprises:
computing a similarity metric between corresponding features in the plurality of whole slide images; and
determining a quantitative measure of spatial correspondence based on the similarity metric.

15. The method of claim 13, wherein registering, using the reconstruction algorithm, the plurality of whole slide images based on one or more features of at least a structure comprises:
identifying, using a convolutional neural network, the at least a structural continuation of the one or more features across the plurality of whole slide images; and
aligning, using the convolutional neural network, the at least a structural continuation.

16. The method of claim 15, further comprising receiving, using a user-configurable option of the graphical user interface, a user input, wherein the user input re-identifies, as a function of a visualization in the graphical user interface, the at least a structural continuation of the first image and the second image.

17. The method of claim 11, wherein the plurality of whole slide images comprise at least a location datum, the location datum identified using at least a label.

18. The method of claim 11, wherein the plurality of whole slide images comprise a magnification of 40×.

19. The method of claim 11, further comprising an imaging device, wherein the imaging device comprises a stage, objective, and image sensor, and wherein the at least a processor is further configured to:
communicate with the imaging device to capture the plurality of whole slide images; and
receive, from the imaging device, the plurality of whole slide images.

* * * * *